United States Patent Office 2,969,293
Patented Jan. 24, 1961

2,969,293

VITREOUS ENAMEL

Dudley C. Smith, Vineland, N.J., assignor to Kimble Glass Company, a corporation of Ohio No Drawing. Filed Dec. 31, 1956, Ser. No. 631,400

8 Claims. (Cl. 106—49)

This invention relates to vitreous enamels for application to glass. More particularly, this invention is drawn to an improved vitreous enamel having specific utility for application to the low expansion glasses of which the borosilicate type glasses are examples.

The conventional and commercially available decorating enamels (also frequently referred to as "colors") are applied to the soda-lime-silica type glasses with little or no difficulty. However, these conventional decorating enamels, or colors, are not successfully applied to the low thermal coefficient of expansion glasses of the borosilicate type due to the fact that severe weakening thereof occurs, as discussed more fully hereinafter. The conventional enamels utilized in the art of decorating or marking glassware are essentially low-melting glasses consisting of a clear low-melting flux, mechanically mixed with a coloring oxide. These conventional enamels generally soften at about the annealing temperature of glass and have expansivities in the range of 60 to $90 \times 10^{-7}/°$ C. The enamels are usually applied by a squeegee printing technique, by silk screening, or deposited in etched or ground lines, followed by firing at a temperature below the softening point of the glass to which they are applied (1000° F. to 13000° F.). The flux component of these conventional enamels consists primarily of lead oxide, which oxide provides the low-melting characteristics of the enamel. Analyses of several of the commercially available vitreous enamels, or colors, are given in Table 1 below, listing the weight percent of various constituents found therein.

TABLE 1

| Analysis | Composition A (a white enamel), wt. percent | Composition B (a green enamel), wt. percent | Composition C (a blue enamel), wt. percent |
|---|---|---|---|
| Silica | 27.86 | 27.17 | 30.00 |
| Boric Oxide | 4.16 | 2.93 | 2.78 |
| Alumina | 1.28 | .84 | 1.65 |
| Titanium Oxide | 12.54 | None | 5.95 |
| Cobalt Oxide | None | 1.19 | 1.75 |
| Zinc Oxide | None | 2.26 | None |
| Cadmium Oxide | None | 7.25 | None |
| Lead Oxide | 48.81 | 51.01 | 48.92 |
| Barium Oxide | None | None | None |
| Calcium and Magnesium Oxide | .16 | .17 | .29 |
| Sodium Oxide | 2.89 | 1.08 | 2.93 |
| Potassium Oxide | .19 | .22 | 1.65 |
| Lithium Oxide | .73 | None | .71 |
| Arsenic Oxide | 0.58 | 0.10 | None |
| Antimony Oxide | None | None | .09 |
| Phosphorous Pentoxide | None | None | Trace |
| Sulphur Trioxide | [1] N.D. | None | Trace |
| Fluorine | None | [1] N.D. | None |
| Chromium Oxide | None | 5.62 | None |
| Ignition Loss | .87 | .09 | .36 |
|  | 100.07 | 99.93 | 97.08 |

[1] Not determined.

As indicated, while enamels of the type yielding the analyses listed in Table 1 are quite satisfactory for application to the soda-lime-silica type glasses, they are definitely unsatisfactory for application to the low thermal coefficient of expansion glasses of the borosilicate type. Thus, it has been found that the application of these conventional enamels to the borosilicate type glasses induces a zone of weakness precisely at the point of application. The zone of weakness reflects itself in frequent and undesirable breakage principally at the margin of the applied enamel. It is believed that the foregoing is caused by the setting-up of stresses in the base glass after application and firing of the enamels due to the differences in the coefficient of expansion between the base borosilicate glass and the vitreous enamel. Another shortcoming which is observed in the case of the conventional enamels applied and fired on borosilicate glasses is the weakness of the resulting decoration; thus, the decoration is easily chipped, while crazing is observed at the interface between the decorating enamel and the base glass.

Accordingly, it is an object of this invention to overcome the above noted objections, and to that end it provides an improved vitreous enamel, or color, for application to the low expansion glasses.

It is another object of this invention to provide a vitrifiable low-melting enamel composition of low thermal expansivity which is suitable for application to low expansion glasses of the borosilicate type under commercial conditions.

A particular object of this invention is to provide an improved enamel, capable of being applied in a relatively thick layer to the borosilicate glasses, and characterized by the incorporation therein of low thermal expansion silica-containing material to reduce the thermal coefficient of expansion of the mixture to substantially that of the borosilicate glass.

The specific nature of this invention, as well as other objects and advantages thereof, will become apparent to those skilled in the art from the following detailed description of several preferred embodiments.

The enamels of this invention can be prepared by simply modifying any of the conventional enamels, or colors, by incorporating therein finely divided materials which are capable of yielding silica at the fusion temperature, and charcterized by having a coefficient of expansion not substantially greater than about $5 \times 10^{-7}/°$ C. Examples of the foregoing materials are finely divided amorphous silica, and the lithium aluminum silicates of which beta eucryptite, spodumene, and petalite are representative. Amorphous silica has a coefficient of expansion of approximately $5 \times 10^{-7}/°$ C. Beta eucryptite $(Li_2O \cdot Al_2O_3 \cdot 2SiO_2)$ has a coefficient of thermal expansion of approximately $-60 \times 10^{-7}/°$ C. The other lithium aluminum silicates (namely, spodumene, $$Li_2O \cdot Al_2O_3 \cdot 4SiO_2$$

and petalite, $Li_2O \cdot Al_2O_3 \cdot 8SiO_2$) likewise have negative coefficients of thermal expansion. The modification of the conventional enamels is simply carried out by physically mixing the enamel and modifier sufficiently to yield an intimate mixture thereof. To compare the enamels of this invention with conventional enamels, there were carried out a series of experiments and tests generally involving the application of various conventional enamels and enamels of this invention to glass tubes, principally to etched lines therein, followed by comparative observations and strength determinations. A comparison of the relative strength of the tubes bearing the various enamels demonstrates the superiority of the enamels of this invention.

The glass tubes were prepared from a glass composition of the following formulation:

$SiO_2$ ---- 80.6
$B_2O_3$ ---- 13.0
$Na_2O$ ---- 4.1
$Al_2O_3$ ---- 2.2

A glass of this formulation has a coefficient of thermal expansion of about $32 \times 10^{-7}/°$ C. Etched lines were induced in the glass tubes in the following fashion: The tubes were coated with a paraffin wax, and circumferential lines scribed thereon. They were then immersed in hydrofluoric acid for several minutes, the action of which effected an etched line at the zone of scribing. The tubes were then exposed to an atmosphere of steam to remove the wax. The etched lines in the tubes were then filled with an enamel, and the tube fired at about 1000° F. to 1300° F. to fuse the enamel to the etched portion of the tube. The breaking strength of these tubes was determined by subjecting the tube, supported at each end of an 8" span, to a transverse loading in the center until failure. A comparison of the breaking strength of a tube containing a fired enamel in the etched line versus an identical tube but containing no enamel in the etched line is afforded by calculating the percent loss in strength due to the applied enamel according to the following formulation:

$$\text{Percent loss in strength due to applied enamel} = \frac{L1 - L2}{L1} \times 100$$

where L1 is equal to the load required to break the tube containing no enamel, and L2 equals the load required to break the tube containing an enamel fused thereto in the etched line.

*Example 1*

An improved enamel of this invention was prepared by physically mixing a mixture consisting of 95 wt. percent of a conventional enamel similar to the enamel yielding the analysis identified under Composition C of Table 1, and 5 wt. percent of a finely divided amorphous silica. The mixing was carried out in a ball mill and was continued until homogeneous. A paste of the resulting intimate mixture was prepared by adding printing oil. The paste was applied to the etched line of one of the tubes described above, and the tube was then fired at a temperature of 1050° F. for 20 minutes. The tube was then subjected to the beam loading test described above until the tube broke.

Similar enamels of this invention were prepared by the procedure outlined above, but containing increasing proportions of finely divided amorphous silica. These enamels were also applied to glass tubes, fired, and subjected to the beam loading test. For purposes of comparison, there was also prepared a tube utilizing the same base enamel, but containing no amorphous silica. The results of these tests are given in Table 2, listing the wt. percent of conventional enamel, the wt. percent of amorphous silica, and the resulting percent loss in strength due to the enamel, calculated according to the formula appearing above.

TABLE 2

| Weight Percent of Conventional Enamel | Weight Percent Amorphous Silica | Percent Loss in Strength Due to Applied Enamel |
|---|---|---|
| 100 | 0 | 63 |
| 95 | 5 | 54 |
| 90 | 10 | 46 |
| 80 | 20 | 36 |
| 70 | 30 | 16 |

As can be seen from the table, an enamel of this invention containing as little as 5 wt. percent of amorphous silica demonstrates less loss in strength than a conventional enamel. A composition of this invention representing a content of 30 wt. percent of amorphous silica demonstrated only 16% loss in strength or, in other words, improved the strength by about 75% on the basis of the observed strength demonstrated by the conventional enamel containing no amorphous silica.

*Example 2*

As another example of this invention illustrating the advantages of the enamels of this invention prepared by utilizing a lithium aluminum silicate, there was first prepared a quantity of beta eucryptite ($Li_2O \cdot Al_2O_3 \cdot 2SiO_2$). A charge of 22.6% $Li_2Co_3$, 75.1% Pioneer clay, and 2.7% flint was mixed in a ball mill for one hour, sintered at 2400° F. for one hour, and a sample withdrawn for X-ray diffraction. The remainder of the batch was re-milled and sintered as before and another sample withdrawn for X-ray diffraction. The two X-ray diffraction patterns matched and, as lines for silica, alumina, and metakaolin were absent, the synthesis was considered complete.

To check the results, chemical analysis of the two separate similarly prepared batches were compared with calculated values of oxide composition for beta eucryptite. The results are given in Table 3.

TABLE 3

| Oxide | Calculated for Beta Eucryptite | Found in Analyses of— | |
|---|---|---|---|
| | | Batch #1 | Batch #2 |
| $Li_2O$ | 11.9 | 10.6 | 10.3 |
| $R_2O_3$ (mainly $Al_2O_3$) | 40.4 | 39.48 | 40.32 |
| $SiO_2$ | 47.7 | 49.20 | 48.72 |
| | 100.00 | 99.28 | 99.34 |

An enamel similar to that yielding Composition C of Table 1 was modified with 10%, 20%, 30%, 40%, and 50% by weight of the just prepared beta eucryptite. The enamels so prepared, and representing enamels of this invention were applied to bottles formed from a borosilicate glass having the formulation listed hereinbefore. The enameled bottles were matured at 1050° F. for thirty minutes and then quenched in air. Ring sections were cut from the bottles and examined under the microscope. Stress accumulations were minimal and were the same order of magnitude as identical bottles bearing no enamel. In contrast, a ring section cut from an identical bottle bearing an enamel containing no beta eucryptite contained the characteristic semi-circular tension area at the edge of the enamel, usually encountered when the conventional enamels are coated on bottles formed from a low expansion glass of the borosilicate type.

*Example 3*

To demonstrate the advantages of the enamels of this invention prepared by the use of beta eucryptite as a modifier, there was prepared another series of enamels formulated from a base composition similar to that yielding Composition C of Table 1. The compositions of the invention were prepared by adding various amounts of beta eucryptite and mixing in the manner described in Example 1. In Table 4, Composition E, containing no beta eucryptite, represents a conventional enamel, and Compositions F, G, and H, containing various proportions of beta eucryptite, represent compositions of the invention.

TABLE 4

| Composition | Weight Percent of Enamel Similar to Composition C of Table 1 | Weight Percent Beta Eucryptite |
|---|---|---|
| E | 100 | 0 |
| F | 90 | 10 |
| G | 75 | 25 |
| H | 55 | 45 |

Nine bottles were coated with each of the compositions listed in Table 4, using a No. 25 silk screen, following which the coated bottles were matured at 1150° F. for 10 minutes. Examination of the bottles after maturing showed that all the bottles bearing Composition E (a conventional enamel) were checked and/or crazed under the enamel, while the bottles bearing enamel Compositions F, G, H showed no checking or crazing.

All of the bottles were then subjected to an impact test as follows: The bottles were individually placed on a slowly revolving pedestal. A weighted pendulum was allowed to swing through varying degrees of arc and strike the bottle. Each bottle was subjected to three impacts from angles of arc of 15°, 20°, 25°, and 30°, successively. The number of bottles which broke were noted. For purposes of comparison, nine identical bottles bearing no enamel were also subjected to the test. The results of the test are tabulated in Table 5.

TABLE 5—IMPACT BREAKAGE

| Angle of Pendulum | 15° | | | 20° | | | 25° | | | 30° | | |
|---|---|---|---|---|---|---|---|---|---|---|---|---|
| Number of Impacts | 1 | 2 | 3 | 1 | 2 | 3 | 1 | 2 | 3 | 1 | 2 | 3 |
| Composition of Enamel Applied to Bottles: | | | | | | | | | | | | |
| Control, bottles containing no enamel coating | | | | | | | 3 | 1 | 1 | 1 | 2 | 1 |
| E | 8 | 1 | | | | | | | | | | |
| F | | | | 3 | 1 | 1 | 2 | 1 | 1 | | | |
| G | | | | | | | 3 | 1 | 2 | | | |
| H | | | | 1 | 0 | 1 | 5 | 2 | | | | |

Examination of the data shows that eight of the bottles bearing the conventional enamel (E) broke on the first swing of the weighted pendulum through the 15° arc, and that one bottle broke on the second swing, or impact. In contrast, the bottles bearing compositions F, G, and H, representing compositions of this invention, did not break at all until the arc of the pendulum was at least 20°, and, in the case of Composition H, only two bottles broke in the 20° arc, the remainder requiring 25° arc.

Another series of bottles was coated with these same compositions as described above and were then subjected to a hydrostatic breakage test. In this test, the bottles were connected to a vacuum pump and the air exhausted until the bottles failed (implode). The pressure at the time of implode was recorded. The results of the hydrostatic breakage test are given in Table 6, where the values of the pressure at implode represent the average of twelve determinations.

TABLE 6—HYDROSTATIC BREAKAGE

| Composition of Enamel Applied to Bottles | Pressure at Implode, Average of 12 Determinations, p.s.i. |
|---|---|
| Control, no applied enamel | 523 |
| E | 250 |
| F | 365 |
| G | 346 |
| H | 321 |

An examination of the data in Table 6 reveals that the bottles bearing the enamels of this invention, e.g., compositions F, G, H, withstood appreciably greater vacuum pressures than the bottle bearing the conventional enamel identified as Composition E, containing no beta eucryptite.

A series of bottles bearing enamels of this invention was also subjected to a series of durability tests. These tests included immersing the enameled bottles into boiling detergents, concentrated HCl, $H_2SO_4$, and $HNO_3$. In no case were any adverse effects observed.

*Example 4*

In another series of tests, a white enamel similar to that yielding Composition A of Table 1 was applied as a band about a series of glass tubes six inches long, having an outside diameter of 8.7 millimeters and a wall thickness of from 1.15 to 1.20 millimeters. The tubing was prepared from a borosilicate type glass having the same composition as referred to hereinbefore. The tubes, after firing and annealing, were subjected to a transverse loading in a fashion similar to that described in connection with Example 1, and the breaking strength of the tubes was noted. At the same time, identical tubes bearing no band of applied enamel were similarly tested for breaking strength. Additionally, an enamel of this invention was prepared by adding to a portion of the above enamel, 15% by weight of a lithium aluminum silicate having a coefficient of thermal expansion of about $5 \times 10^{-7}/°C$. This enamel of the invention was likewise applied as a band to a series of identical tubes. After firing and annealing, the tubes were subjected to a transverse loading, and the breaking strength noted. The results of these tests are given in Table 7 on the following page, listing the number of pieces tested, the average breaking strength, and the percent of reduction in strength. An examination of the data appearing in this table clearly reveals the superiority of the enamels of this invention in that they eliminate the reduction in strength encountered with the conventional enamels presently used.

TABLE 7

| | Control (No Enamel) | Banded with Conventional White Enamel | Banded with Enamel of Invention Containing 15% Lithium Aluminum Silicate |
|---|---|---|---|
| No. of Tubes Tested | 17 | 21 | 20 |
| Average Breaking Strength, lbs | 62.5 | 47.1 | 63.5 |
| Percent Reduction in Strength | | 24.6 | None |

In general, the enamels of this invention may represent a rather broad range of proportion of the aforesaid modifiers in combination with conventional enamels. It has been found that as little as 5 wt. percent amorphous silica incorporated into a conventional enamel produces an enamel capable of successful application to borosilicate glass, and when so applied gives an enamel-bearing glass article of improved strength. Optimum strength of glass articles is observed utilizing an enamel of this invention representing a content of about 30% by weight of amorphous silica. Preferably, the enamels of this invention should not contain substantially greater than 30% by weight of amorphous silica, as such enamel exhibits poor resistance to acids and alkalies, and, in addition, does not satisfactorily fuse to the borosilicate glass at practical firing temperatures. The lithium aluminum silicates may be successfully utilized in an even wider range of proportions, thus, beta eucryptite may be used in amounts of from about 10% to 80% by weight in compounding enamels of this invention. Less than 10% modification imparts little improvement in properties. If more than 80% of the beta eucryptite is utilized, difficulties are encountered in firing the enamel at practical firing temperatures. Most preferably, the enamels of this invention contain the lithium aluminum silicates in an amount of from about 10% to 50% by weight.

The enamels of this invention can be prepared by introducing any of the aforesaid modifiers in the dry state with the conventional enamel, preferably of the lead oxide type, and intimately mixing in, for instance, a ball mill. The enamels of this invention may also be prepared by mixing the aforesaid modifiers with a conventional enamel which has first been put into a liquid state, such as is provided by solubilizing the conventional enamel in a liquid vehicle, such as printing oil. The enamels comprising this invention may also be prepared by modifying a conventional enamel with a chemical compound which decomposes on heating to release silica. Ethyl silicate is an example of the foregoing.

Prior to the present invention, manufacturers of low expansion glassware desirably containing enamels decorations, enamel printing, or enamel lines in the case of, for instance, laboratory ware, have had to resort to various schemes in order to avoid the accompanying zones of weakness referred to hereinbefore. One suggestion which has been utilized to some extent is to apply the design or line by a staining process, utilizing, for example, silver or copper sulfide; however, this suggestion has one serious drawback in that the resulting decoration or line is extremely weak-looking. It has also been suggested that the setting-up of stresses inducing the zone of weakness and susceptibility to breakage can be avoided by delicate control of the thickness of the applied enamel. To successfully carry-out this suggestion, it has been found necessary to apply enamel in a very thin coat, the thickness being controlled within very narrow limits. If the applied enamel is so applied and controlled, it is found that the enamel layer is too weak mechanically to impose any large stresses on the base glass to which applied, and yielding occurs in the enamel. While the foregoing avoids stress inducement and ultimate reduction in strength of the glass article bearing the enamel decoration, this solution is very much unsatisfactory in other respects. For example, while enamel thickness control is comparatively easy in the case of articles whose surfaces are relatively smooth and uniform, it is much more difficult, if not impossible, with respect to bottles and other molded items whose surfaces are subject to slight irregularities and imperfections. It has further been found that many enamels do not have sufficient inherent opacity to achieve a definite contrast when they are applied in such thin layers. It has also been found that the control of enamel thickness requires special methods of application and markedly increases the cost of the enameled ware. Finally, and most important, controlling an enamel thickness is impossible in producing laboratory glassware such as pipettes, burettes, thermometers, etc., where the enamel must be deposited at the bottom of an etched or ground line. Close examination of the etched or ground surface reveals it to be, in fact, quite rough; consequently, an attempt to deposit a thin layer of enamel results in an extremely weak-looking line. It is furthermore found that, in the case of the etched or ground line, considerable stress persists, and the major objection of reduction in strength occurs.

In accordance with this invention, a wide range of improved vitreous enamels are prepared suitable for application to low expansion glasses of the borosilicate type. Glass articles formed from a borosilicate type glass and bearing a decoration, printing, or line formed from an enamel of this invention are possessed of markedly superior strength and, as well, are characterized by the fact that the enamel is markedly more resistant to abrasion, scratching, acids, alkalies, etc.

The enamels of this invention can be applied by any of the ordinary commercial methods of application, such as squeegee printing, silk screen printing, or merely filled into the etched lines usually present in glassware of the laboratory type, e.g., burettes, thermometers, etc. Fusion of these enamels to the base glass is readily accomplished by firing at the usual temperatures. The fact that the enamels of this invention exhibit ready fusion to the base borosilicate glass at conventional temperatures was considered quite unexpected inasmuch as the proportion of modifier used substantially reduces the overall proportion of lead oxide, which oxide imparts the low-melting characteristic of the conventional enamels. Of great importance is the fact that enamels of this invention can be applied in about any desired thickness without the reduction in strength usually associated with the vitreous enamels. This, of course, proves of ultimate benefit to the chemist or other user who is, by the use of such distinctly calibrated ware, able to carry out measurements, determinations, and observations with a far greater degree of accuracy.

While there have been disclosed with considerable detail certain preferred manners of performing this invention, it is not intended or desired to be solely limited thereto, for as hitherto stated, the procedure may be modified, the precise proportions of the materials utilized may be varied, and other materials having equivalent properties may be employed if desired without departing from the spirit and scope of the invention as defined in the appended claims.

I claim:

1. A vitreous enamel for decorating a low expansion borosilicate glass consisting of an intimate mixture of (a) 20 to 95% of a lead oxide type enamel component containing at least 48% of PbO and at least 75% of PbO and $SiO_2$ combined and (b) 5 to 80% of a finely divided silica-containing material selected from the class consisting of amorphous silica, beta eucryptite, spodumene, and petalite, the amount of said material being selected to reduce the thermal expansion coefficient of the mixture to substantially that of the borosilicate glass.

2. The enamel of claim 1 wherein the silica-containing material is silica, which is combined with the enamel in the proportion of 5–30% by weight silica.

3. The enamel of claim 1 wherein the silica-containing material is beta eucryptite, which is combined with the enamel in the proportion of 10–80% by weight beta eucryptite.

4. The enamel of claim 1 wherein the silica-containing material is spodumene, which is combined with the enamel in the proportion of 10–80% by weight spodumene.

5. The enamel of claim 1 wherein the silica-containing material is petalite, which is combined with the enamel in the proportion of 10–80% by weight petalite.

6. The enamel of claim 1 wherein the silica-containing material is beta eucryptite, which is combined with the enamel in the proportion of 10–50% by weight beta eucryptite.

7. The enamel of claim 1 wherein the silica-containing material is spodumene, which is combined with the enamel in the proportion of 10–50% by weight spodumene.

8. The enamel of claim 1, wherein the silica-containing material is petalite, which is combined with the enamel in the proportion of 10–50% by weight petalite.

References Cited in the file of this patent

UNITED STATES PATENTS

| | | |
|---|---|---|
| 2,225,162 | Deyrup | Dec. 17, 1940 |
| 2,282,540 | Deyrup | May 12, 1942 |
| 2,556,896 | Beatty et al. | June 12, 1951 |

OTHER REFERENCES

Tooley: Handbook of Glass Manufacture, Ogden Publishing Co., 1953, pp. 16 and 17.

Clark et al.: "Foote Prints," vol. 22, No. 2 (1950), pages 24 to 26 (abstract in "Enamel Bibliography and Abstracts," 1956, page 49g).